UNITED STATES PATENT OFFICE.

GEORGE B. BURNHAM, OF BERKELEY, CALIFORNIA.

PROCESS OF RECOVERING POTASSIUM CHLORID FROM SALINE WATERS.

1,286,932.   Specification of Letters Patent.   Patented Dec. 10, 1918.

No Drawing.   Application filed December 20, 1917.   Serial No. 208,081.

*To all whom it may concern:*

Be it known that I, GEORGE B. BURNHAM, a citizen of the United States, and a resident of Berkeley, county of Alameda, and State of California, have invented a certain new and useful Process of Recovering Potassium Chlorid from Saline Waters, of which the following is a specification.

The invention relates to a process of recovering potassium chlorid from saline waters and particularly from the brines of the alkaline lakes of the western United States.

An object of the invention is to provide a cheap process for recovering potassium chlorid from saline waters containing the same.

The invention possesses other advantageous features, some of which, with the foregoing, will be set forth at length in the following description where I shall outline in full one form of the process of my invention. I shall describe the process as applied to the brine of Searle Lake in California, but it is to be understood that the process is not limited to this particular brine.

Searles Lake brine contains sodium, and potassium, chlorid, sulfate, carbonate and borate, and is nearly saturated with sodium chlorid. When a brine is encountered which is not saturated with sodium chlorid, it is necessary to bring it to saturation with sodium chlorid and to maintain it at saturation or nearly so throughout the process. By the process of my invention I am able to employ natural temperatures for evaporation and cooling without causing the formation of double salts of potassium, so that single salts only are separated from the liquor. I prefer to make use of the temperature variations of winter and summer, but in some instances it may be possible to carry out the process with the difference in temperature between day and night and also artificial variations in temperature may be employed.

In the preferred form of the process, the brine is pumped from the lake in December into a large shallow vat which is partitioned off into a series of smaller vats. The brine is pumped continuously throughout the month and in twenty-four hours the first small vat is filled, and at daybreak, when the brine is at its coldest, it is allowed to flow into the second vat of the series. At daybreak the next day, the second small vat is emptied into the third vat and the first into the second vat and so on, and this process is continued day after day until all of the small vats are filled. All of the vat gates of the series are opened at the same time to allow a continuous flow through the vats.

The brine thus exposed in the shallow vats is subjected to evaporation and chilling with the result that sodium borate and sodium sulfate are crystallized out in the first half of the series of shallow vats and sodium carbonate in the second half of the series, all due to the chilling of the brine to lower and lower temperatures in the succeeding shallow vats. Since the brine is saturated with sodium chlorid, this will be crystallized out by evaporation throughout the series, but this can be prevented if desired by adding sufficient water to the brine to compensate for the water of crystallization that is taken up by the crystals deposited, and the evaporation.

The object of the series of shallow vats is to cause a low temperature to be reached (approximating $-4°$ C. at Searles Lake) and also to minimize the heat of crystallization by depositing only a portion of the crystals in each vat. Crystals will re-dissolve in solution much slower than they will crystallize out and hence the series of vats prevents re-solution of the crystals during the warmer temperature of the day.

When the brine has passed through the series of shallow vats, wherein sodium sulfate, sodium borate, sodium carbonate and sodium chlorid, have been crystallized out, it is flowed into a large winter evaporating vat, the depth of which should be such that approximately 11% of the water will be evaporated in this and the prior vats before the end of the cold season. A small amount of sodium salts will be deposited in this vat, but on account of the low temperature and saturation of the brine with sodium chlorid, no double salts of potassium are formed. From the large vat the brine is flowed during February into a series of shallow vats in order to obtain the greatest chilling effect possible and to prevent supersaturation by keeping the brine in motion.

From the shallow vats the brine is flowed into the main summer evaporating vat which should be about six feet deep in order to secure the desired evaporation and to insure an approximately even temperature between day and night. Sodium chlorid will be crystallized out in this vat and the brine becomes nearly saturated with potassium chlorid and is nearly saturated with a double potassium salt, and care must be taken that the evaporation is not continued long enough to produce crystallization of this double salt and still at the same time keep the brine at as high temperature as possible to the point of saturation with KCl.

During July and August the brine is flowed into a shallow vat so that it may reach a higher temperature, the vaporization in this and the prior vat equaling about 38% of the brine. The depth of the brine in the shallow vat is such that it will become saturated with KCl at the highest temperature reached during the middle of the day. When this condition of saturation is reached the brine is flowed into a deep vat to minimize further evaporation, in which the brine cools until winter, thereby crystallizing out KCl. Since the brine is saturated with sodium chlorid, the small amount of evaporation which occurs in the deep vat will tend to cause sodium chlorid to be crystallized out, but this may be prevented by adding sufficient water to the brine in the vat to compensate for the loss by evaporation, thereby insuring a purer quality of KCl. The brine is allowed to cool in the deep vat until it almost reaches saturation with sodium carbonate or sodium sulfate, that is, about 5° C., at which temperature about one-third of the KCl is crystallized out. A further reduction of temperature would produce an undesired deposit of sodium carbonate and sodium sulfate. The remaining liquor is then flowed back to the first vat and mixed with fresh brine from the lake and the process is repeated. The addition of this residual liquor increases the percentage of potassium in the brine to such an extent that after passing through the series of shallow vats, the brine may be flowed directly into the main summer evaporating vat. If the concentration of KCl in the brine caused by mixing the mother liquor with the lake brine is greater than the brine can hold at its cooling stage then water must be added to the vat in winter to prevent KCl from crystallizing out on cooling. In the first year of the process, it is necessary to evaporate water during the winter, but in the second year and each year thereafter, as long as the lake brine continues its present composition, it is necessary to add water in winter in order to supply water of crystallization for the sulfates, carbonates and borates, and thereby prevent the crystallization of potassium chlorid in the first evaporating vats.

I claim:

1. The process of recovering potassium chlorid from liquors containing potassium, and sodium, chlorid, sulfate and carbonate, and approximately saturated with sodium chlorid, which consists in cooling the liquor to crystallize out sodium sulfate and sodium carbonate, removing the liquor from the deposited crystals, raising the temperature of the liquor and evaporating a portion of the water, whereby sodium chlorid is crystallized out and the liquor is approximately saturated with potassium chlorid, separating the warm liquor from the deposited crystals and cooling the liquor to crystallize out potassium chlorid.

2. The process of recovering potassium chlorid from liquors containing sodium, and potassium, chlorid, sulfate and carbonate and approximately saturated with sodium chlorid, which consists in chilling and partially evaporating the liquor whereby sodium sulfate, sodium carbonate and sodium chlorid are crystallized out, separating the chilled liquor from the deposited crystals, heating the liquor and evaporating a portion of the water, whereby sodium chlorid is crystallized out and the warm liquor becomes saturated with potassium chlorid, separating the warm liquor from the deposited crystals, cooling the liquor whereby potassium chlorid is crystallized out, and adding water to the liquor to prevent crystallization of the sodium chlorid.

3. The process of recovering potassium chlorid from liquors containing sodium, and potassium, chlorid, sulfate and carbonate, which consists in cooling the liquor, whereby sodium sulfate and sodium carbonate are crystallized out, bringing the liquor to saturation with sodium chlorid by evaporation, separating the liquor from the deposited crystals, heating the liquor to evaporate a portion of the water and crystallize out sodium chlorid and bring the liquor to approximate saturation with potassium chlorid, separating the warm liquor from the deposited crystals and chilling the liquor to crystallize out potassium chlorid.

4. The process of recovering potassium chlorid from liquors containing potassium, and sodium, chlorid, sulfate and carbonate, which consists in cooling the liquor to crystallize out sodium sulfate and sodium carbonate and bringing the solution to approximate saturation with sodium chlorid, separating the cool liquor from the deposited crystals, heating and evaporating the liquor to crystallize out sodium chlorid and bring the liquor to near saturation with potassium chlorid, separating the warm liquor from the deposited crystals, cooling the liquor to crystallize out potassium chlorid, separating the liquor from the deposited salts and adding it to a fresh supply of the original liquor and repeating the steps of the process.

5. The process of recovering potassium chlorid from liquors containing potassium, and sodium, chlorid, sulfate and carbonate which consists in cooling the liquor to crystallize out sodium sulfate and sodium carbonate and bringing the solution to approximate saturation with sodium chlorid, separating the cool liquor from the deposited crystals, heating and evaporating the liquor to crystallize out sodium chlorid and bringing the liquor to near saturation with potassium chlorid, separating the warm liquor from the deposited crystals, cooling the liquor to crystallize out potassium chlorid, separating the liquor from the deposited salts, adding the liquor to a fresh supply of the original liquor, adding water to the liquor, and continuing the process.

6. The process of recovering potassium chlorid from liquors containing sodium, and potassium, chlorid, sulfate and carbonate, and approximately saturated with sodium chlorid, which consists in flowing the liquor in winter in shallow vats wherein it is chilled and partially evaporated whereby sodium chlorid, sodium sulfate and sodium carbonate are crystallized out, flowing the liquor at the end of winter into a deep vat wherein it is subjected to summer heat to reduce the water contents sufficiently to crystallize out sodium chlorid and approximately saturate the liquor with potassium chlorid, flowing the warm liquor into a deep vat at the end of summer and allowing it to cool in the deep vat, whereby potassium chlorid is crystallized out, and preventing the crystallization of sodium chlorid in the last deep vat.

In testimony whereof, I have hereunto set my hand at San Francisco, California, this 11th day of December, 1917.

GEORGE B. BURNHAM.

In presence of—
H. G. PROST.